United States Patent
Aoki et al.

(10) Patent No.: US 8,154,814 B2
(45) Date of Patent: Apr. 10, 2012

(54) METHOD OF REFRESHING DATA STORED ON A DISK

(75) Inventors: Takao Aoki, Hanno (JP); Yasuhiko Ichikawa, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/824,109

(22) Filed: Jun. 25, 2010

(65) Prior Publication Data

US 2011/0019302 A1    Jan. 27, 2011

(30) Foreign Application Priority Data

Jul. 24, 2009    (JP) ................. 2009-173501

(51) Int. Cl.
*G11B 15/04* (2006.01)

(52) U.S. Cl. ........................................ 360/60

(58) Field of Classification Search .......... 360/60, 360/31, 39, 54, 62; 365/189.14, 222; 380/200
See application file for complete search history.

(56) References Cited

U.S. PATENT DOCUMENTS

| | | | |
|---|---|---|---|
| 5,193,072 A * | 3/1993 | Frenkil et al. | 365/189.14 |
| 6,563,755 B2 * | 5/2003 | Yahata et al. | 365/222 |
| 6,567,091 B2 * | 5/2003 | Dye et al. | 345/501 |
| 7,149,160 B2 | 12/2006 | Kibashi et al. | |
| 7,382,673 B2 * | 6/2008 | Hummler | 365/222 |
| 2008/0137847 A1 * | 6/2008 | Candelore et al. | 380/200 |

FOREIGN PATENT DOCUMENTS

| | | |
|---|---|---|
| JP | 2002-100126 A | 4/2002 |
| JP | 2004-273060 A | 9/2004 |
| JP | 2008-257782 A | 10/2008 |

OTHER PUBLICATIONS

Information Sheet for preparing an Information Disclosure Statement.

Notice of Reasons for Rejection mailed by Japan Patent Office on Sep. 7, 2010 in the corresponding Japanese patent application No. 2009-173501.

* cited by examiner

*Primary Examiner* — Fred Tzeng
(74) *Attorney, Agent, or Firm* — Knobbe, Martens, Olson & Bear, LLP

(57) ABSTRACT

According to one embodiment, a disk comprises an area which comprises a plurality of data tracks and is partitioned into a first segment and a plurality of second segments. A controller detects that a segment to be refreshed next is one of the plurality of second segments. The controller saves data stored in the one of the plurality of second segments into the first segment when a segment to be refreshed next is the one of the plurality of second segments.

13 Claims, 8 Drawing Sheets

| Cyl. Group \ Head | 0 | 1 | ... | m-1 |
|---|---|---|---|---|
| 0 | W(0,0) | W(1,0) | ... | W(m-1,0) |
| 1 | W(0,1) | W(1,1) | ... | W(m-1,1) |
| 2 | W(0,2) | W(1,2) | ... | W(m-1,2) |
| ⋮ | ⋮ | ⋮ | ⋮ | ⋮ |
| n-1 | W(0,n-1) | W(1,n-1) | ... | W(m-1,n-1) |

FIG. 9

METHOD OF REFRESHING DATA STORED ON A DISK

CROSS-REFERENCE TO RELATED APPLICATIONS

This application is based upon and claims the benefit of priority from Japanese Patent Application No. 2009-173501, filed Jul. 24, 2009, the entire contents of which are incorporated herein by reference.

BACKGROUND

1. Field

One embodiment of the invention relates to a method of refreshing data stored on, for example, a disk.

2. Description of the Related Art

In recent years, with the increasing storage capacity of magnetic disk drives, the recording density and track density have been getting higher. As the track density gets higher, the distance (i.e., track pitch) between adjacent tracks (or data tracks) on the disk gets shorter. Each track has the same width as that of the head (or a writing element included in the head). However, the width of the distribution of the recording magnetic field produced by the head in a write operation does not necessarily coincide with the width of the head, with the result that the magnetic field is also applied to the surrounding area. This state is known as write fringing.

If the track pitch is made narrower, there is a possibility that the data (or recorded data) written on adjacent tracks will deteriorate in writing data onto the tracks. The deterioration of data is attributable to write fringing and errors in positioning the head on the track. If the recorded data is deteriorated repeatedly, it becomes very difficult to read the data. That is, even if an attempt is made to restore the recorded data by making best use of an error-correcting code (ECC), it is difficult to restore the data.

With this backdrop, in the field of recent magnetic disk drives, data refreshing (or rewriting) is indispensable for restoring the recorded data before the data becomes unreadable due to data deterioration. As a method of returning the recorded data to the normal state, an operation called data refreshing exists, in which the deteriorated recorded data is read from, and then rewritten to a track.

For example, Jpn. Pat. Appln. KOKAI Publication No. 2004-273060 has disclosed a technique for refreshing the data written on a track adjacent to a track whose number of data writes has reached a specific value (hereinafter, referred to as the related art). According to the related art, first, it is determined that the data on a track adjacent to a track whose number of data writes has reached a specific value has deteriorated. Next, the data on such an adjacent track is read as data to be refreshed and is stored temporarily into a RAM. Then, the data on the adjacent track temporarily stored in the RAM is written again onto the adjacent track. That is, the data on a track to be refreshed is rewritten with the data read from the track. By such a data rewriting operation, or a data refreshing operation, the data is restored from the deterioration.

In the related art, however, if the power supply of the magnetic disk drive is shut down during a data refreshing operation, the data on a track to be refreshed can be lost. More specifically, if the power supply of the magnetic disk drive is shut down during the operation of writing the data read from a track to be refreshed onto the track again (hereinafter, referred to as a rewrite operation), the data can be lost. The reason why this is so will be explained below.

First, suppose the power supply is shut down during a rewrite operation. In this case, the data on a track to be refreshed is destroyed. At this time, the data on the track to be refreshed temporarily stored in the RAM disappears. Accordingly, even if the power supply is restored, the unfinished rewrite operation cannot be performed again, with the result that the data on the track to be refreshed is lost.

To prevent such a problem, use of a specific track on the disk in place of the RAM is considered. That is, use of a specific track on the disk as a save area (or a backup track) for temporarily saving (i.e., backing up) the data on the track to be refreshed is considered.

When a specific track on the disk is used as a save area, a save operation and a rewrite operation are carried out as follows. In a save operation, the data read from a track to be refreshed is written onto (or saved to) a specific track. In a rewrite operation, the data read from a specific track is rewritten onto the track to be refreshed, with the result that the data recorded on the track to be refreshed is refreshed.

In a save operation, a first seek operation is performed to move the head from the track to be refreshed to a specific track. In a rewrite operation, a second seek operation is performed to move the head from the specific track to the track to be refreshed.

As described above, when a specific track is used as a save area, two seek operations are required to refresh the data on a single track. Generally, recent disks have about 160,000 tracks per recording surface. In a magnetic disk drive with such a disk, the head has to move over a long distance corresponding to an average of 160,000 tracks to refresh the data on a single track.

BRIEF DESCRIPTION OF THE SEVERAL VIEWS OF THE DRAWINGS

A general architecture that implements various features of the invention will now be described with reference to the drawings. The drawings and their associated descriptions are provided to illustrate the embodiments of the invention and not to limit the scope of the invention.

DETAILED DESCRIPTION

Various embodiments according to the invention will be described hereinafter with reference to the accompanying drawings. In general, according to one embodiment of the invention, there is provided a method of refreshing data stored on a disk in a magnetic disk drive. The method comprises: detecting that a segment to be refreshed next is one of a plurality of second segments, the disk comprising an area which comprises a plurality of data tracks and is partitioned into a first segment and the plurality of second segments; and saving second data stored in the one of the plurality of second segments into the first segment when a segment to be refreshed next is the one of the plurality of second segments.

Figure 1:
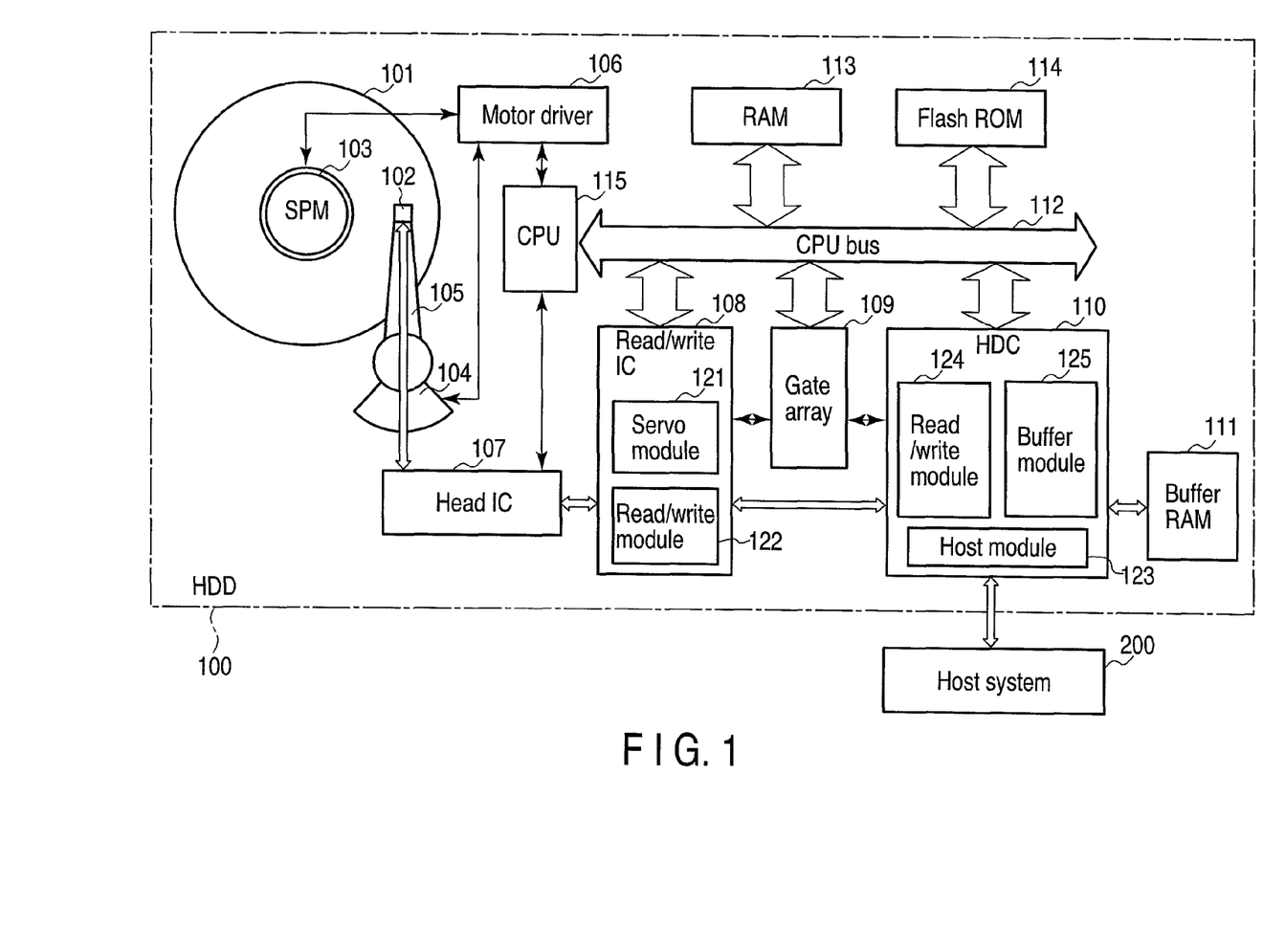
FIG. 1 is a block diagram showing an exemplary configuration of a magnetic disk drive (HDD) according to an embodiment of the invention.

FIG. 1 is a block diagram showing the configuration of a magnetic disk drive (HDD) according to an embodiment of the invention. The HDD 100 shown in FIG. 1 is a storage device for writing data onto the recording surface of a disk (or a magnetic disk) 101 or read the data from the recording surface according to a request from a host system 200. The host system 200 is a device, such as a personal computer, which uses the HDD 100 as a storage device.

The disk 101, which is secured to a spindle motor (SPM) 103, rotates at a constant speed as a result of the SPM 103 being driven. For example, one side of the disk 101 is a recording surface onto which data is recorded magnetically. A head (or magnetic head) 102 is arranged so as to face the recording surface of the disk 101. The head 102 is secured to one end of an actuator 105. The other end of the actuator 105 is secured to a voice coil motor (VCM) 104. With the VCM 104 being driven, the head 102 moves over a part of the circular arc trajectory around the pivot of the VCM 104, the part overlapping with the surface of the disk 101.

The configuration of FIG. 1 is based on the assumption that the HDD 100 includes a single disk 101. However, the configuration may be such that a plurality of disks 101 are secured to the SPM 103 in such a manner that the disks 101 are spaced at equal intervals. In this case, a plurality of actuators 105 are secured to the VCM 104 in such a manner that the actuators 105 overlap with the disks 101 so as to correspond to the intervals of the disks 101. A head 102 is secured to one end of each of the plurality of actuators 105. Accordingly, when the SPM 103 is driven, all the disks 101 rotate simultaneously. When the VCM 104 is driven, all the heads 102 move simultaneously. In the configuration of FIG. 1, one side of the disk 101 is a recording surface. Both sides of the disk 101 may be recording surfaces and heads 102 may be arranged so as to correspond to the respective recording surfaces.

Figure 2:
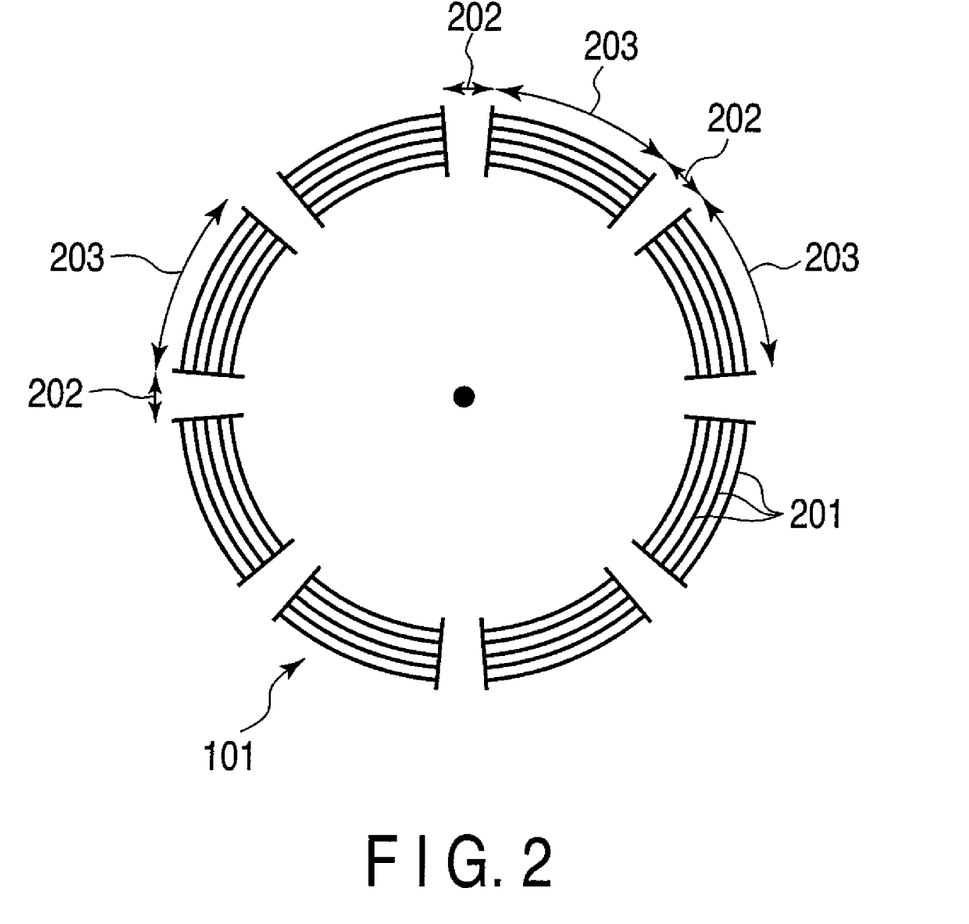
FIG. 2 is a conceptual diagram showing an exemplary format including the track arrangement of a disk applied to the embodiment.

FIG. 2 is a conceptual diagram showing a format including the track arrangement of the disk 101. In FIG. 2, on the recording surface of the disk 101, a plurality of tracks (or data tracks) 201 are arranged concentrically. The data received by the HDD 100 from the host system 200 is recorded to at least one of the plurality of tracks 201 according to an address specified by the host system 200.

On the plurality of tracks 201 of the disk 101, servo areas 202 and data areas 203 are arranged alternately at equal intervals. In each of the servo areas 202, a servo signal used to position the head 102 is recorded. Each of the data areas 203 is used to record data transferred from the host system 200.

To return to FIG. 1, a CPU 115 functions as the main controller of the HDD 100. The CPU 115 performs control via a motor driver 106 to start and stop the SPM 103 and maintain the rotational speed. The CPU 115 also performs drive control of the VCM 104 via the motor driver 106, thereby performing control of moving the head 102 to the target track and of settling the head in the target range of the track. Control of moving the head 102 to the target track is known as seek control. Control of settling the head 102 in the target range of the target track is known as head positioning control. The CPU 115 further performs control of refreshing the data written in the track 201 on the disk 101 (data refreshing process).

The positioning of the head 102 is performed in a state where the SPM 103 is rotating steadily after start-up. As described above, the servo areas 202 (see FIG. 2) are arranged equiangularly. Accordingly, the servo signals recorded in the servo areas 202 appear in equal intervals of time in an analog signal read by the head 102 from the disk 101 and amplified by a head IC 107. A read/write IC 108 (or a servo module 121 included in the read/write IC 108) and a gate array 109 process the analog signal making use of this state, thereby generating a signal for positioning the head 102. On the basis of the positioning signal, the CPU 115 controls the motor driver 106 to cause the motor driver 106 to supply a current for positioning the head 102 (or a VCM current) to the VCM 104 in real time. The CPU 115 not only controls the SPM 103 and VCM 104 via the motor driver 106 but also controls other components of the HDD 100 and executes a command process and the like. The CPU 115 is connected to a CPU bus 112.

Connected to the CPU bus 112 are the read/write IC 108, the gate array 109, a disk controller (HDC) 110, a RAM 113, and a flash ROM 114. The flash ROM 114 is a rewritable nonvolatile memory. The flash ROM 114 is rewritten under the control of the CPU 115. In the flash ROM 114, a program to be executed by the CPU 115 has been stored. The aforementioned control performed by the CPU 115 is realized as a result of the CPU 115 executing the program.

The RAM 113 is used to store, for example, various variables used by the CPU 115. A part of the storage area of the RAM 113 is used as a work area of the CPU 115. Another part of the storage area of the RAM 113 is used to store a write count table 400 (see FIG. 4) which holds a write count (or the number of writes) for each track group. The track group and write count table 400 will be described later.

The read/write IC 108 includes a servo module 121 and a read/write module 122. The servo module 121 carries out a signal process necessary to position the head 102, including the extraction of a servo signal. The read/write module 122 executes a signal process for reading and writing data. The gate array 109 generates various control signals, including a signal for the servo module 121 to extract a servo signal.

The HDC 110 is connected not only to the CPU bus 112 but also to the read/write IC 108, the gate array 109, and a buffer RAM 111. The HDC 110 includes a host module 123, a read/write module 124, and a buffer module 125. The host module 123 has a host interface control function of receiving a command (i.e., a write command or a read command) transferred from the host system 200 and controlling the data transfer between the host and the HDC 110. The read/write module 124, which is connected to the read/write IC 108 and gate array 109, carries out the process of reading and writing data via the read/write IC 108. The buffer module 125 controls the buffer RAM 111. A part of the storage area of the buffer RAM 111 is used as a write buffer for temporarily storing data (or write data) to be written onto the disk 101 via the HDC 110 (or the read/write module 124 of the HDC 110). Another part of the storage area of the buffer RAM 111 is used as a read buffer for temporarily storing data (or read data) read from the disk 101 via the HDC 110.

Each of the read/write IC 108, gate array 109, and HDC 110 includes a control register (not shown). These control registers are allocated to a part of the memory space of the CPU 115. The CPU 115 accesses the part of the memory space, thereby controlling the read/write IC 108, gate array 109, or HDC 110 via the corresponding control register.

In the HDD 100 of FIG. 1, data is read as follows. First, a signal (or an analog signal) read by the head 102 from the disk 101 is amplified by the head IC 107. The amplified analog signal is separated by the read/write IC 108 into a servo signal and a data signal. The data signal is decoded by the read/write module 122 of the read/write IC 108 and then transmitted to the HDC 110. The read/write module 124 of the HDC 110 processes the decoded data signal according to the control signal from the gate array 109, thereby generating data to be transferred to the host system 200. This process includes the detection of errors in the data on the basis of ECC data and the correction of errors. The generated data is temporarily stored in the buffer RAM 111 by the buffer module 125 of the HDC 110 and then transferred to the host system 200 by the host module 123 of the HDC 110.

In the HDD 100 of FIG. 1, data is written as follows. Data transferred from the host system 200 to the HDC 110 is received by the host module 123 of the HDC 110 and then temporarily stored in the buffer RAM 111 by the buffer module 125 of the HDC 110. The data stored in the buffer RAM 111 is read by the buffer module 125 and then transmitted to the read/write IC 108 by the read/write module 124 of the HDC 110 according to a control signal from the gate array 109. The data transmitted to the read/write IC 108 is encoded by the read/write module 122 of the read/write IC 108. The encoded data is transmitted to the head 102 via the head IC 102, which writes the data onto the disk 101. The reading/writing of the data is performed under the control of the CPU 115.

Next, an outline of a data refreshing process carried out at the HDD 100 of FIG. 1 will be described with reference to FIG. 3. As described above, to save the data on each track to be refreshed into a specific track on the disk to take measures against power shutdown during a data refreshing operation, the head has to be moved over a long distance for each track. In this case, the data refreshing efficiency decreases. To overcome this problem, the embodiment uses the following characteristic data refreshing process, which makes it possible to increase the data refreshing efficiency by decreasing the number of times the head moves over a long distance, while also taking measures against power shutdown during the data refreshing process.

Generally, the main purpose of a data refreshing process is to avoid the effect of write fringing on adjacent tracks on both sides in writing data onto the individual tracks. Therefore, ideally, it is desirable that the number of times data is written onto an adjacent track (or the number of writes) for each track should be counted and a data refreshing process be carried out for each track. However, since a method of holding the number of writes (or the write count) for all the tracks on a magnetic disk requires a huge memory capacity, the method is not feasible.

In the embodiment, the tracks 201 arranged on the recording surface of the disk 101 are grouped in units of a predetermined number of tracks (e.g., tens to hundreds of tracks). A data refreshing process is carried out for each group. The groups are called track groups. If the total number of tracks 201 on the disk 101 is 160,000 and the number of tracks per track group is 100, the number of track groups per recording surface of the disk 101 is 1/100 of the total number of tracks 201, that is, 1600.

In the embodiment, the total number of times data is written into the track group (or the number of writes) is counted on a track group basis. If the count (or the write count) has reached a predetermined value, a data refreshing process is performed on the corresponding track group.

Figure 3:
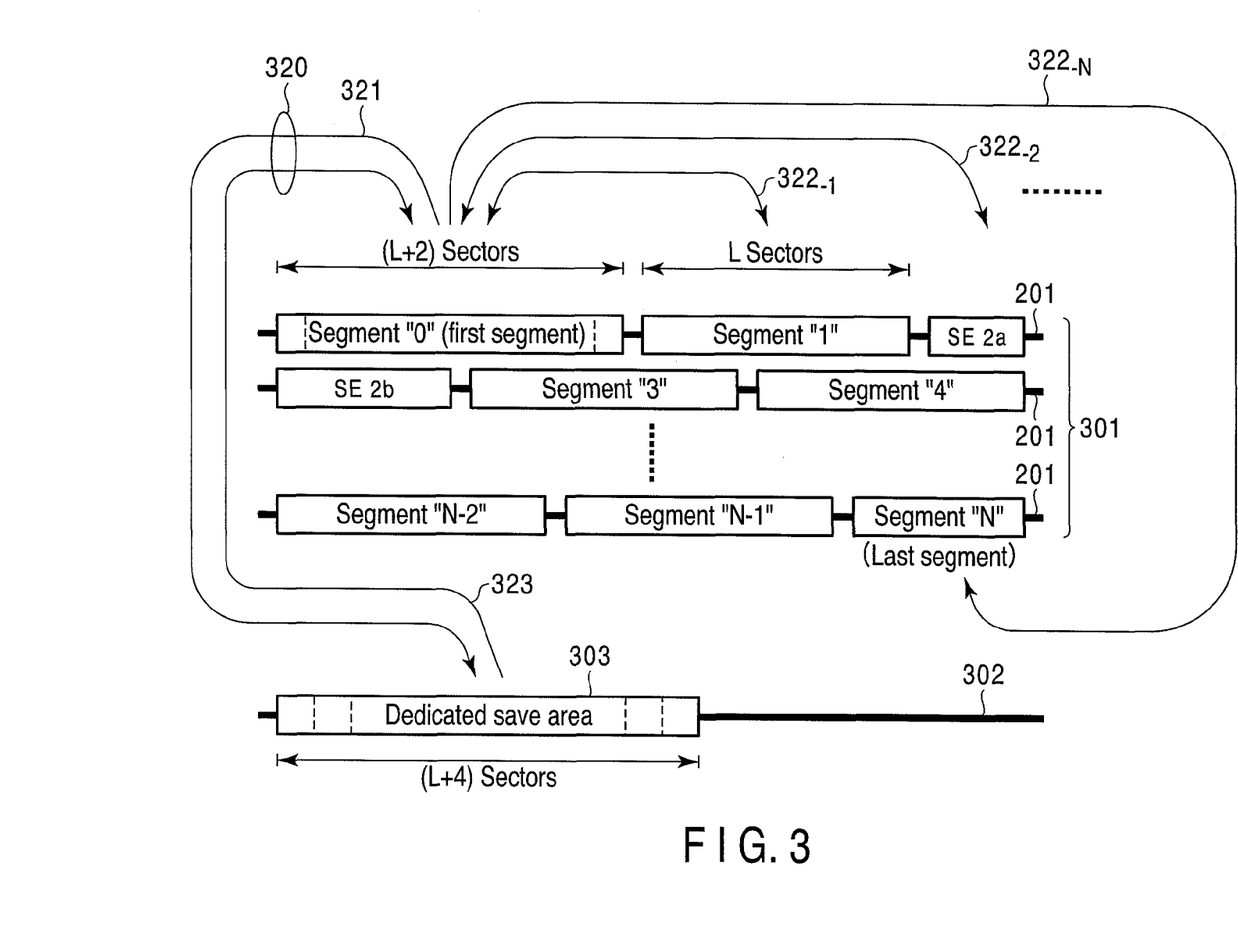
FIG. 3 is a schematic diagram to explain an exemplary data refreshing process applied to the embodiment.

In an example in FIG. 3, one track group 301 on the disk 101 is shown. Also in FIG. 3, a system area 302 that can only be used by the system is shown. The system area 302 generally includes one or more tracks. In the embodiment, a part of a specific track in the system area 302 is allocated as a dedicated save area 303 (or a specific save area). Suppose the specific track does not belong to any track group.

When a set of tracks 201 on the disk 101 is sectionalized into a plurality of groups for management, if the following method is used, the time required to perform a data refreshing process to refresh all the track groups can be suppressed. The method involves reading data from all the tracks in the track group on a track group basis and rewriting the read data onto all the tracks. This method, however, requires a tremendous memory capacity to build a buffer into which data is loaded.

Therefore, in the embodiment, each track group is sectionalized into a predetermined number of segments. Each track group is refreshed in segments sequentially from, for example, the first segment to last segment, which enables all the track groups to be refreshed. Here, the process in which the first segment is refreshed differs from the process in which the second to last segments are refreshed, as will be described below.

In the example of FIG. 3, track group 301 is sectionalized into an (N+1) number of segments "0" to "N." Segment "0" represents the first segment and segment "N" represents the last segment. In FIG. 3, segment element (SE) 2a located at the trailing end of the first track 201 in track group 301 and segment element (SE) 2b located at the leading end of the track 201 following the first track 201 constitute segment "2."

Segment "0" of track group 301 is so set that its segment length is longer than that of the other segments "1" to "N" of track group 301 by two sectors. That is, if each of segments "1" to "N" is composed of L sectors, segment "0" is composed of (L+2) sectors. On the other hand, the dedicated save area 303 is so set that its size is longer than that of segment "0" by two sectors. That is, if segment "0" is composed of (L+2) sectors, the dedicated save area 303 is composed of (L+4) sectors.

The CPU 115 performs a data refreshing process on track group 301 in the following procedure.

(1) A save operation 321 is carried out to save the data stored in the first segment "0" of track group 301 (i.e., the data in (L+2) sectors) into the dedicated save area 303. One-sector header and one-sector footer are added to the front and rear of the data in the (L+2) sectors, respectively.

That is, the save operation 321 includes 1a) the operation of reading (L+2) sectors of data stored in segment "0" and writing the read (L+2) sectors of data into the buffer RAM 111

1b) the operation of adding a header and a footer to the read (L+2) sectors of data 1c) the operation of writing the header-and-footer-added (L+4) sectors of data into the dedicated save area 303.

The save operation 321 is a part of a data refreshing operation 320 for refreshing segment "0" (the first segment). The remaining part of the data refreshing operation 320 is carried out after all of the data refreshing operations $322_{-1}$ to $322_{-N}$ for refreshing segments "1" to "N" (the second segment) respectively have been completed.

(2) A data refreshing operation $322_{-1}$ is carried out to refresh the data (i.e., the L sectors of data) stored in the second segment "1" of track group 301.

The data refreshing operation $322_{-1}$ includes 2a) the operation of reading the L sectors of data stored in segment "1" and of writing the read L sectors of data into the buffer RAM 111

2b) the operation of adding one-sector header and one-sector footer to the front and rear of the read L sectors of data, respectively 2c) the operation of writing (or saving) the header-and-footer-added (L+2) sectors of data into segment "0" and 2d) the operation of refreshing the data stored in segment "1" by rewriting the read L sectors of data into segment "1"

2e) the operation of invalidating the data saved in segment "0."

As described above, segment "0" is used as a temporary save area in refreshing the data stored in the segment "1." In the embodiment, the data saved in segment "0" is invalidated by invalidating, for example, the header of the header and footer added to the data. A header and footer are called a valid header and footer only when both the header and footer are valid. Therefore, if the header of the header and footer is invalidated, the header and footer are not a valid header and footer.

(3) The same data refreshing operations $332_{-2}$ to $332_{-N}$ N as those performed on segment "1" are performed on subsequent segments "2" to N," respectively. Accordingly, segment "0" is also used as a temporary save area in refreshing the data stored in segments "2" to "N."

(4) After the data refreshing operation $322_{-N}$ has been performed on the last segment "N" of track group 301, an unfinished data refreshing operation 320 is performed on segment "0." That is, a rewrite operation 323 is performed. The rewrite operation 323 is the data refreshing operation 320 excluding the already-performed save operation 321.

The rewrite operation 323 includes 4a) the operation of reading the data saved from segment "0" to the dedicated save area 303 in the save operation 321 and of writing the read data into the buffer RAM 111

4b) the operation of refreshing the data stored in segment "0" by rewriting the read data into segment "0"

4c) the operation of invalidating the header added to the data stored in the dedicated save area 303.

As a result of the rewrite operation 323 being performed, the data stored in segment "0" of track group 301 is refreshed. This completes the data refreshing process on track group 301.

In such a data refreshing process, when all the segments "0" to "N" in track group 301 are refreshed, a long-distance seek operation is performed only four times. A long-distance seek operation is carried out to move the head 102 between track group 301 and the dedicated save area 303 away from track group 301. In contrast, when the data in segments "0" to "N" is saved, if the dedicated save area 303 is always used as in the conventional art, a long-distance seek operation is performed as many as 4×(N+1) times. Accordingly, with the embodiment, the number of long-distance seek operations per track group can be reduced remarkably as compared with in the conventional art and therefore the data refreshing efficiency can be improved.

Here, suppose the number of tracks per track group is 100 and the number of tracks per recording surface of the disk 101 is 160,000. In this case, the average head moving distance in a seek operation performed between the first segment and each of the second to last segments of the track group is 1/1600 of the average head moving distance in a long-distance seek operation.

When the power supply of the HDD 100 is shut down during a data refreshing process, the CPU 115 performs a restoration process in the following procedure, thereby realizing the detection of the power shutdown and the restoration of the data.

(Procedure A) The data saved in the dedicated save area 303 is read into the buffer RAM 111.

(Procedure B1) If a valid header and footer have not been added to the data read from the dedicated save area 303, it is determined that there is no data to be restored by using the read data. In this case, the restoration process is terminated.

(Procedure B2) On the other hand, if a valid header and footer have been added to the data read from the dedicated save area 303, it is determined that there is data to be restored. In this case, the data in the first segment "0" is read into the buffer RAM 111.

(Procedure B2-1) If a valid header and footer have not been added to the data read from segment "0," it is determined that there is no data to be restored by using the data read from segment "0." In this case, it is determined that there is data to be restored by using the data read from the dedicated save area 303, and control is passed to procedure C.

(Procedure B2-2) On the other hand, if a valid header and footer are added to the data read from segment "0," it is determined that there is data to be restored by using the data read from segment "0." In this case, the data read from segment "0" is written into the corresponding segment and then the header added to the data saved in segment "0" is invalidated.

(Procedure C) The data read from the dedicated save area 303 is written into segment "0" and then the header added to the data saved in the dedicated save area 303 is invalidated.

Figure 4:
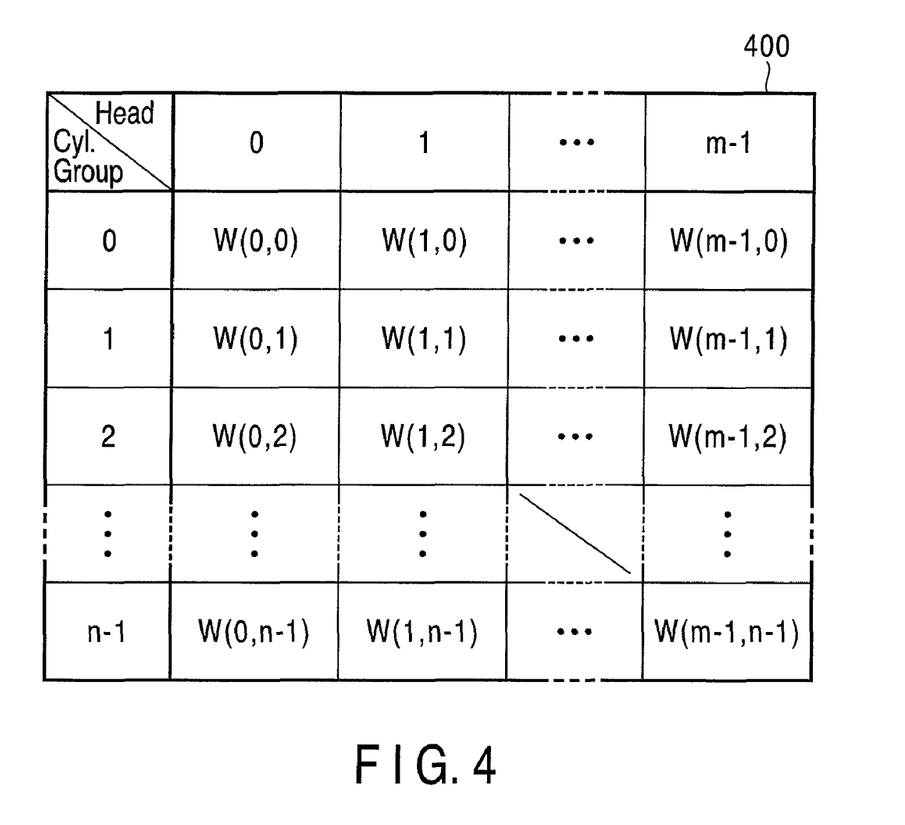
FIG. 4 shows an example of a data structure of a write count table applied to the embodiment.

FIG. 4 shows a data structure of the write count table 400 which holds the number of writes (or the write count) for each track group. The write count table 400 is stored in, for example, a predetermined area of the RAM 113 of FIG. 1. That is, the predetermined area of the RAM 113 is used as a write count storage module which stores the write count table 400.

In the example of the write count table 400 shown in FIG. 4, to generalize the explanation, it is assumed that the HDD 100 includes an m number of heads 102 and that the HDD 100 is composed of an n number of cylinder groups. In this case, the write count table 400 holds the write count (or the number of writes) W(h, c) ($0 \leq h \leq m-1$, $0 \leq c \leq n-1$) for each of all of the track groups represented by a head (or head number) h and a cylinder group (or cylinder group number) c. The write count for a track group is the number of times the operation of writing data into the track group was performed. W(h, c) is used as a write counter which counts the number of writes for a track group specified by the head number h and cylinder group number c. In the case of the configuration of the HDD 100 shown in FIG. 1, m is 1.

A cylinder group is a set of a predetermined number of cylinders. The number of cylinders per cylinder group is the same as the number of tracks per track group. Accordingly, in the HDD 100, the number of track groups with the same cylinder number is the same as the number of heads 102 (that is, m). The track group is specified by the cylinder group number c and head number h. When data is written (or write access is performed) onto a track in the track group specified by the cylinder group c and head number h, the write counter (or the write count) W(h, c) held in the count table 400 is incremented by the number of times writing was done.

In the embodiment, the write count table 400 is stored in the RAM 113 as described above. The contents of the RAM 113 are lost as a result of the power shutdown of the HDD 100. Accordingly, the contents of the write count table 400 are also lost at the time of the power shutdown. Therefore, in the embodiment, the contents of the predetermined area of the RAM 113 including the write count table 400 are saved into a predetermined area of the disk 101 as needed (e.g., when the HDD 100 goes into a power saving state). The contents including the count table 400 saved in the predetermined area of the disk 101 are read at the time of the start-up of the HDD 100 (or when the power supply is turned on) and restored in the RAM 113.

Next, an overall operation of refreshing data in track groups at the HDD 100 of FIG. 1 will be explained with reference to a flowchart in FIG. 5. First, suppose the power supply of the HDD 100 is turned on and the operation of the CPU 115 is started (block 501). Then, the CPU 115 performs the following initialization and restoration processes (block 502). First, the CPU 115 performs a known initialization process on the entire HDD 100. Then, the CPU 115 performs a restoration process related to a data refreshing process. In the restoration process, the CPU 115 checks whether the power supply was shut down in a state a data refreshing process was interrupted during the preceding operation. If the power supply was shut down, the CPU 115 performs control to complete the data refreshing process. In the restoration process, the write count table 400 saved in the predetermined area of the disk 101 is read and stored into the RAM 113.

After the initialization and restoration processes have been completed, the CPU 115 goes into a state where it can receive a command from the host system 200 via the HDC 110. That is, the CPU 115 goes into a command state loop (blocks 503 to 507). In block 503, if having acknowledged the reception of a command from the host system 200 in block 503, the CPU 115 branches to block 511, thereby escaping from the command state loop and performing a process corresponding to the command from the host system 200 (a command process).

On the other hand, suppose it has been determined that the CPU 115 has received no command in block 503 in the command state loop. In this case, an idle time processing is performed. After the command execution process has been completed in block 511, an idle time processing is also performed. The idle time processing includes a data refreshing process. In the embodiment, before going to the data refreshing process, the CPU 115 determines whether to perform the data refreshing process (blocks 504, 505).

In block 504, for example, the CPU 115 determines in a comprehensive manner whether to execute the command from the host system 200 immediately without performing a data refreshing process or to avoid a data refreshing process. It is when the CPU 115 receives the command from the host system 200 immediately after, for example, block 511 is executed that the CPU 115 needs to execute the command immediately. It is when a data refreshing process should be avoided that the HDD 100 is used under bad conditions. Such a state includes, for example, a case where a vibration that exceeds a predetermined level is externally supplied to the HDD 100 and a case where the environmental temperature of the HDD 100 has exceeded a guaranteed operational temperature range of the HDD 100.

In block 505, the CPU 115 determines from the results of a comprehensive determination in block 504 whether the data track refreshing process is feasible. Only when having determined that the data refreshing process is feasible does the CPU 115 perform the data refreshing process (block 506). The data refreshing process will be described in detail later.

If having determined that the data refreshing process is terminated in block 506 or should not be performed in block 505, the CPU 115 proceeds to block 507. In block 507, the CPU 115 determines whether to perform a power saving process to cause the HDD 110 to transit to a power-saving state. If it is determined that the power saving process needs to be performed, the CPU 115 performs the power-saving process. The power-saving process includes an unload process of unloading the head 102 from the disk 101 and/or the process of stopping the rotation of the SPM 103.

If the power-saving process has been performed in block 507, the CPU 115 returns to block 503. In contrast, if the command from the host 200 needs to be executed immediately, the CPU 115 determines that the power-saving process should not be performed in block 507. In this case, the CPU 115 returns to block 503 without performing the power-saving process. From this point on, the CPU 115 repeats the above processes including block 503.

Figure 6:
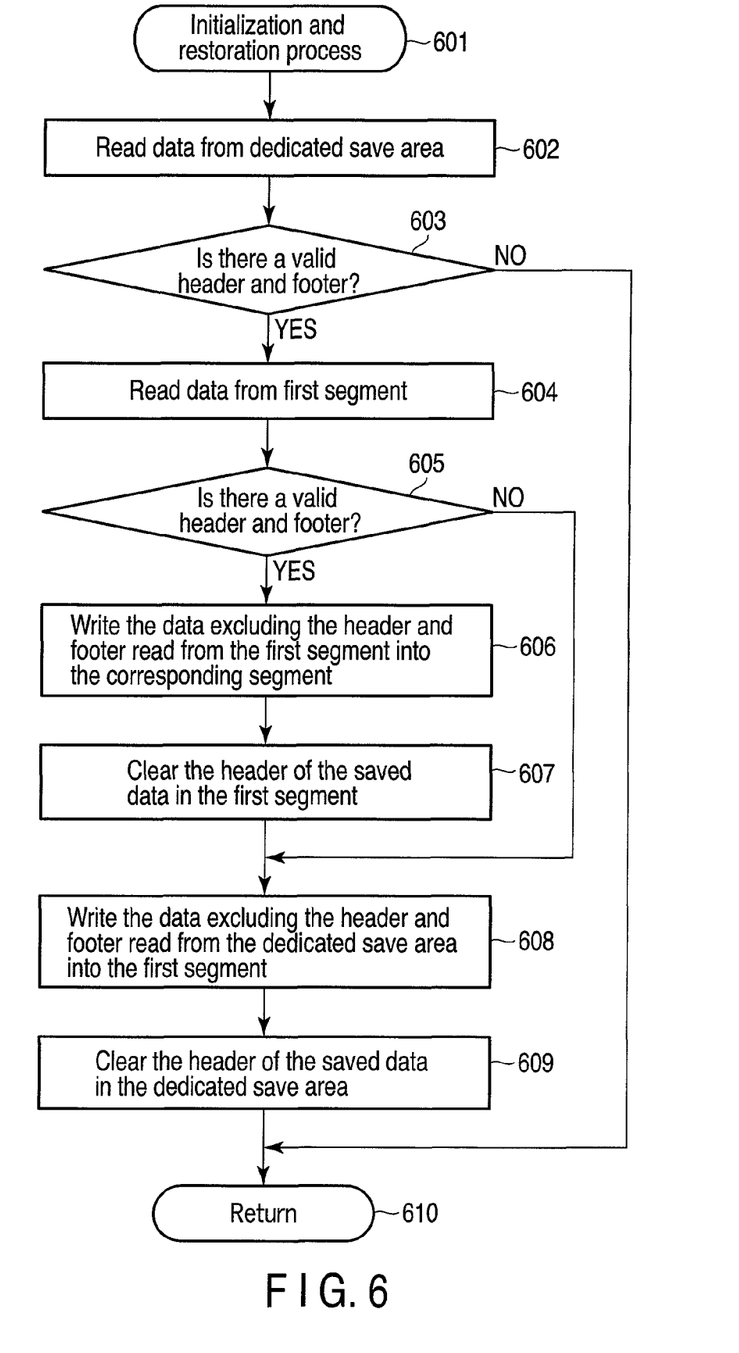
FIG. 6 is an exemplary flowchart to explain a detailed procedure for an initialization and restoration process included in the flowchart of FIG. 5.

Next, the details of the initialization and restoration processes performed in block 502 will be explained with reference to a flowchart in FIG. 6. In the flowchart of FIG. 6, the processes unrelated to data refreshing are omitted. Suppose the initialization and restoration processes are started (block 601). Then, the CPU 115 reads the write count table 400 saved on the disk 101 and stores the table 400 into the predetermined area of the RAM 113. Thereafter, the CPU 115 reads the data saved in the dedicated save area 303 into the buffer RAM 111 (block 602).

As described above, in the data refreshing operation, when the data in a certain segment of a track group (e.g., track group 301) is read, a header and a footer are added to the read data. The header-and-footer-added data is saved into a save location (or the dedicated save area 303 or the first segment "0" of track group 301). Thereafter, the read data is rewritten into the certain segment. Lastly, to invalidate the data saved in the save location, the header added to the data is invalidated (i.e., cleared). This completes the data refreshing operation.

Accordingly, if the data refreshing operation has been completed, the valid data (that is, the valid-header-footer-added data) will never be left in the save location. Conversely, if the valid-header-footer-added data is left in the save location, this means that an unexpected power shutdown has occurred in the middle of a data refreshing operation. In this case, there is a high possibility that power shutdown took place in the middle of writing data into a segment (or a original location) in which the data saved in the save location ought to be stored and the data in the segment was destroyed. Therefore, the data saved in the save location has to be written into the original location reliably.

The CPU 115 makes a determination for that in block 603. The targets to be determined in block 603 are the header and footer added to the data read from the dedicated save area 303 into the buffer RAM 111. That is, in block 603, the CPU 115 determines whether a valid header and footer have been added to the data read from the dedicated save area 303.

In the embodiment, the header and footer include the same information. Accordingly, in the embodiment, the invalidation of the data saved in the save location is realized by clearing the header of the header and footer added to the data. In this case, checking whether the contents of the header are the same as those of the footer make it possible to determine (detect) whether the header and footer are valid.

Here, suppose the CPU 115 has determined that a valid header and footer have not been added to the data read from the dedicated save area 303 (NO in block 603). The result of the determination means that the data refreshing operation 320 using the dedicated save area 303 as a save location (see FIG. 3) has been completed and therefore the last performed refreshing process for the track group (e.g., track group 301) has been completed. In this case, it is not necessary to check the first segment "0" serving as another save location. Then, the CPU 115 branches to block 610 to terminate the initialization and restoration processes and then proceeds from block 502 to block 503 as shown in the flowchart of FIG. 5.

In contrast, suppose the CPU 115 has determined that a valid header and footer have been added to the data read from the dedicated save area 303 (YES in block 603). That is, it is assumed that a valid header and footer have been detected from the dedicated save area 303. The result of the determination means that the last performed data refreshing process for the track group has not been completed. The track group performed in the last performed data refreshing process can be pinpointed by the valid header and footer as described later. Here, suppose the track group is track group 301.

In the data refreshing operation 320 using the dedicated save area 303 as a save location, a saving operation 321 is performed to save the data in the first segment "0" at the very beginning of the data refreshing process for track group 301. Then, a rewrite operation 323 is performed at the very end of the data refreshing process for track group 301. In the rewrite operation 323, the data saved in the dedicated save area 303 is rewritten into the first segment "0" and then the header added to the data saved in the dedicated save area 303 is invalidated.

Accordingly, since the result of the determination in block 603 is YES, the CPU 115 only detects that the data refreshing process for track group 301 has not been completed. Thus, the CPU 115 reads the data saved in the first segment "0" of track group 301 which is used as a save location (block 604). Then, the CPU 115 determines whether a valid header and footer have been added to the data read from segment "0" (block 605).

If a valid header and footer have been added to the data read from segment "0" (YES in block 605), the CPU 115 branches to block 606. In block 606, the CPU 115 writes the data read from segment "0" from which the header and footer have been removed into the corresponding segment, the original location. Next, the CPU 115 invalidates (or clears) the header added to the data saved in segment "0" (block 607). As a result, the CPU 115 ends the restoration process using segment "0." Then, to perform the restoration process using the dedicated save area 303, the CPU 115 branches from block 607 to block 608.

In the embodiment, each of the valid header and footer added to the data saved in the dedicated save area 303 holds a predetermined character string indicating that the header and footer are valid and attribute information indicating the address (e.g., logical block address LBA) of the first sector of segment "0" and the length (or the size) of segment "0" and the like. Accordingly, segment "0" from which data is to be read in block 604 and track group 301 to which segment "0" belongs can be specified from the attribute information (logical block address LBA and length) in the header and footer.

Similarly, each of the valid header and footer added to the data saved in segment "0" used as a temporary save area holds the predetermined character string and attribute information indicating the logical block address LBA of the first sector of the corresponding segment, the original location, and the length of the corresponding segment and the like. Accordingly, the corresponding segment can be specified from the attribute information (logical block address LBA and length) in the header and footer.

On the other hand, if the valid header and footer have not been added to the data read from segment "0" (NO in block 605), the CPU 115 skips blocks 606 and 607 and branches to block 608. It is when the power supply is shut down immediately after the data refreshing operation 322$_N$ for the last segment "N" of track group 301 has been completed that the result of the determination in block 605 is NO. In addition to this, in the data refreshing operation 322-$i$ for segment "$i$" ($i=1, 2, N$) excluding the first segment "0," if the power supply is shut down before the data in segment "$i$" is saved into the save location (i.e., segment "0") (e.g., in the middle of reading data from segment "$i$"), the result of the determination in block 605 is NO.

In block 608, the CPU 115 writes into the first segment "0" the data read from the dedicated save area 303 into the buffer RAM 111 in block 602 excluding the header and footer. Next, the CPU 115 clears the header added to the data stored in the dedicated save area 303, thereby invalidating the header (block 609). Then, the CPU 115 branches to block 610 to terminate the initialization and restoration processes and proceeds from block 502 to block 503 as shown in the flowchart of FIG. 5.

In a state where the initialization and restoration processes shown in the flowchart of FIG. 6 have been completed, the data in another segment has not been saved into segment "0" used as a save location (or a temporary save area) in the last data refreshing process. That is, the data in all the segments of a track group to be subjected to the data refreshing process (hereinafter, referred to as the corresponding track group) including the data in segment "0" can be accessed properly.

Here, the purpose of the initialization and restoration processes is to restore the data from unexpected power shutdown that occurred in the middle of the data refreshing process. The completion of the initialization and restoration processes does not mean the completion of the corresponding track group. This is because what are restored in the initialization and restoration processes are only the data in the segment subjected to a data refreshing process at the time of power shutdown and the data in the first segment "0" used as a save location for the data refreshing process. That is, this is because, in the initialization and restoration processes, the remaining part of the data refreshing process interrupted due to power shutdown is not performed.

Figure 5:
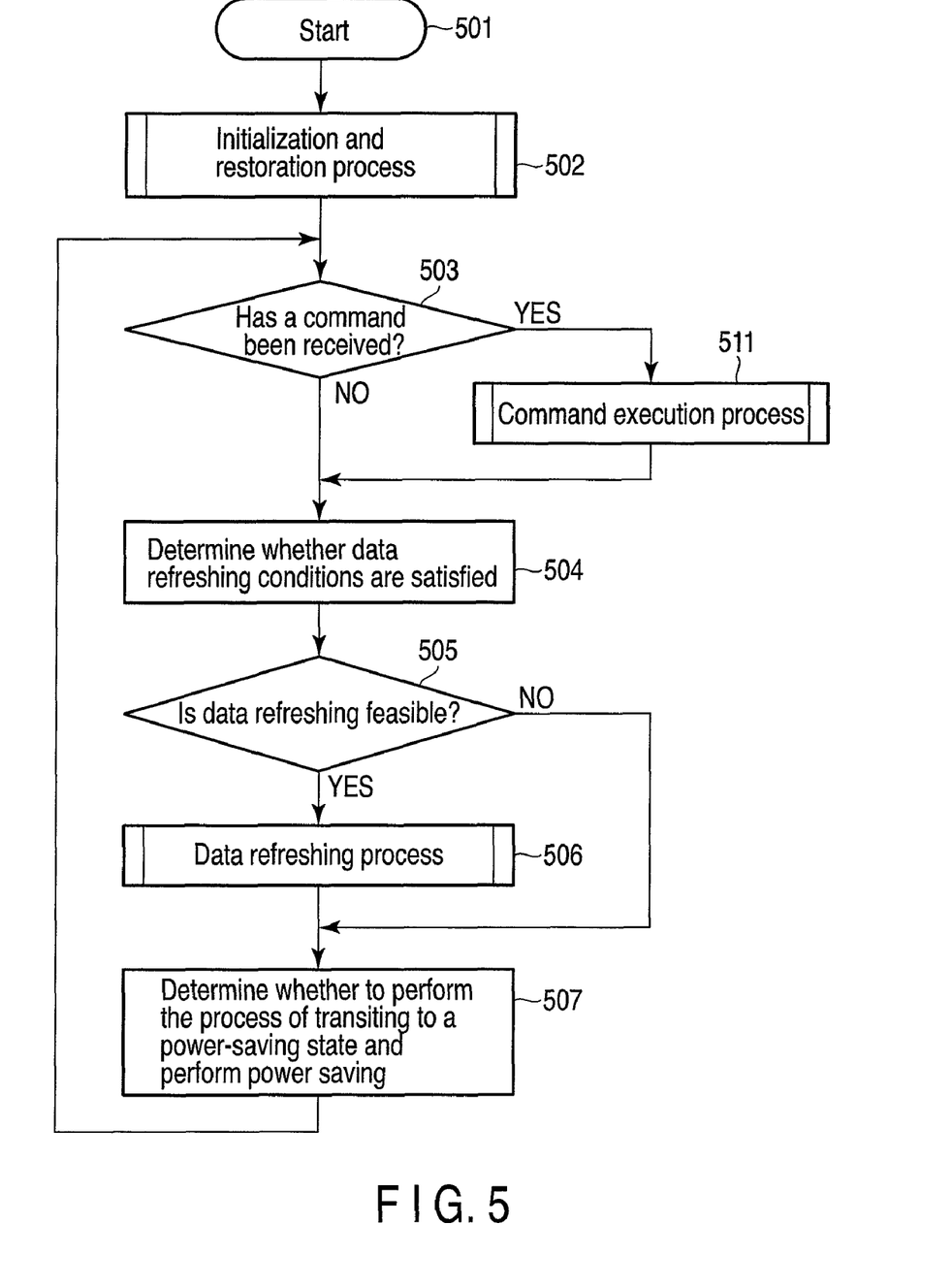
FIG. 5 is an exemplary flowchart to explain an overall operation of the HDD of FIG. 1.

In the embodiment, to overcome this problem, after the corresponding track group has been subjected to the initialization and restoration processes (block 502) of FIG. 5, the data refreshing process is performed again, starting from the first segment "0" of the corresponding track group. The reason this is done is that, in the data refreshing process, the process of clearing the corresponding count in the write count table 400 is not performed until all of the segments in the track group have been subjected to the data refreshing process. The track group is detected again as a track group to be refreshed by searching the write count table 400 after the completion of the initialization and restoration processes.

Figure 7:
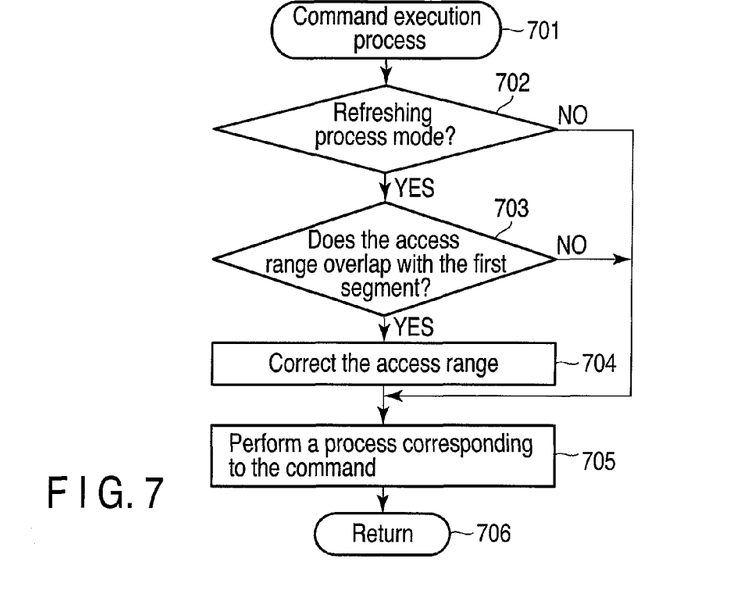
FIG. 7 is an exemplary flowchart to explain a detailed procedure for a command execution process included in the flowchart of FIG. 5.

Next, a detailed procedure for a command execution process performed in block 511 will be explained with reference to a flowchart in FIG. 7. As described above, the command execution process is performed when a command from the host system 200 is received. As a result, a process corresponding to the command is performed. If a data refreshing process is being performed on a certain track group, such as track group 301, when a command is received, the first segment "0" in track group 301 is used as a save location (or a temporary save area) for a data refreshing process for another segment in track group 301. That is, data in another segment "0" of track group 301 has been saved in segment "0." The data in segment "0" has been saved in the dedicated save area 303. Therefore, if the received command requests access to an area overlapping with at least a part of the first segment "0," it is necessary to access the dedicated save area 303 in place of segment "0." That is, it is necessary to correct the access range specified by the received command. The access range is corrected in a command execution process.

If the command execution process is started (block 701), the CPU 115 determines whether the HDD 110 is in the refreshing process mode (block 702). In the refreshing process mode, a data refreshing operation is performed on each segment in the selected track group.

If the HDD 100 is not in the refreshing process mode (NO in block 702), the CPU 115 branches to block 705 and performs a command process. In contrast, if the HDD 100 is in the refreshing process mode (YES in block 702), the CPU 115 branches to block 703. In block 703, the CPU 115 determines whether at least a part of the access range on the disk 101 specified by the received command overlaps with the first segment "0" of the track group subjected to the data refreshing process now being performed. The access range is specified by the address (e.g., the logical block address LBA) and size specified by the received command. The CPU 115 determines on the basis of the result of the determination in block 703 whether the correction of the access range is needed.

If it has been determined that at least a part of the access range does not overlap with the segment "0" (NO in block 703), the CPU 115 determines that the correction of the access range is unnecessary and branches to block 705. In contrast, if it has been determined that at least a part of the access range overlaps with the segment "0" (YES in block 703), the CPU 115 corrects the access range (block 704).

In block 704, the overlapped part of the access range specified by the received command is changed so as to indicate the dedicated save area 303. This causes the dedicated save area 303, not the overlapped part, to be accessed in the access range. On the other hand, the remaining part is accessed in a normal manner. Accordingly, for example, if such a write command as specifies an access range a part of which overlaps with the first segment "0" has been received, the writing of data into the dedicated save area 303 and the writing of data into the remaining part of the specified access range are performed consecutively.

Figure 8:
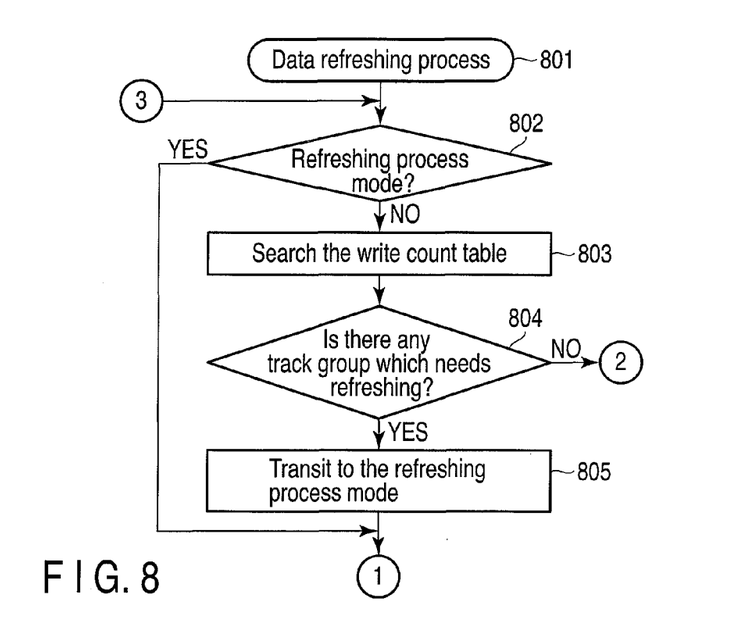
FIGS. 8 and 9 respectively show first and second parts of an exemplary flowchart to explain a detailed procedure for a data refreshing process included in the flowchart of FIG. 5.
Figure 9:
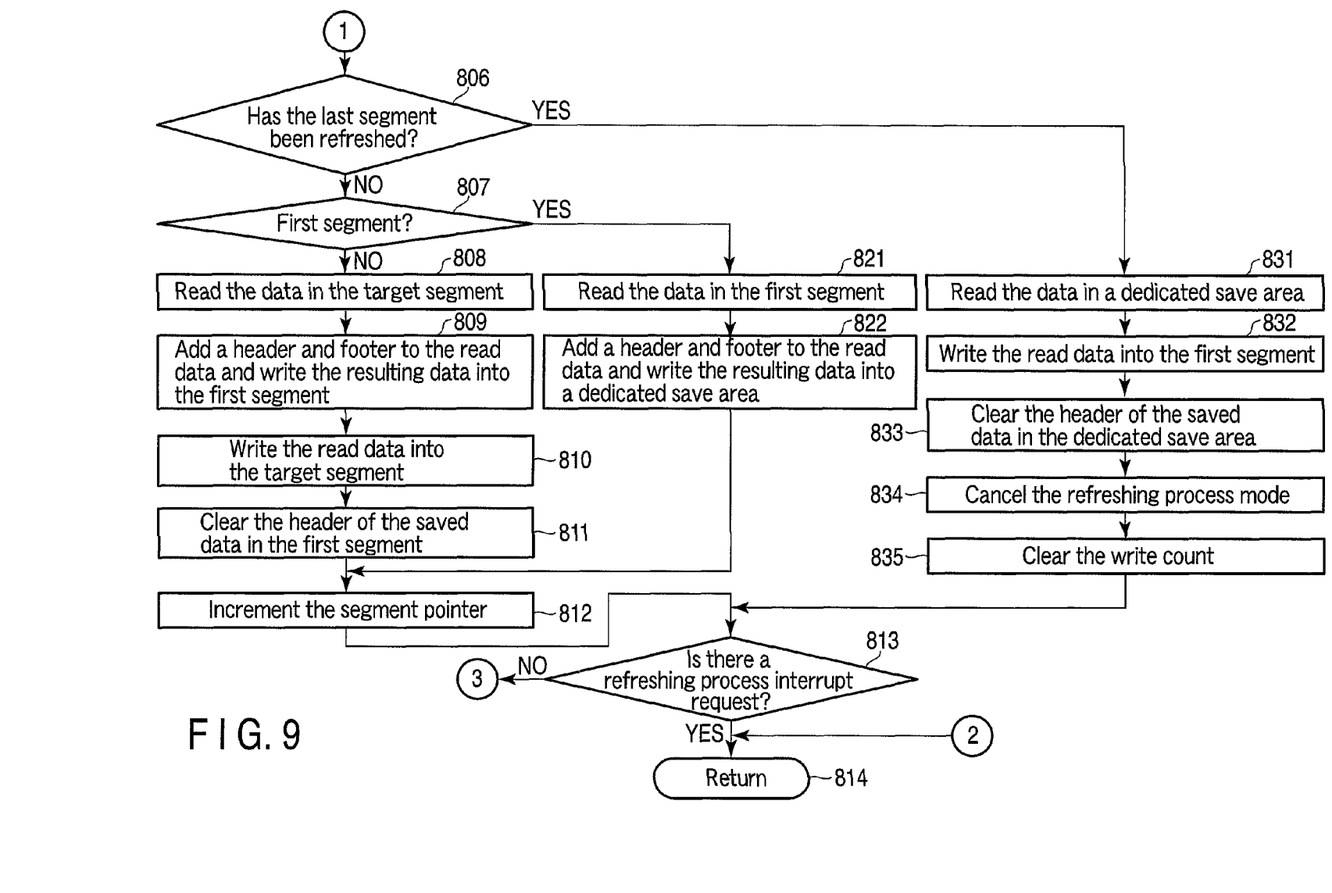

Next, a detailed procedure for the data refreshing process performed in block 506 will be explained with reference to flowcharts in FIGS. 8 and 9. Suppose a data refreshing process is started (block 801). Then, the CPU 115 determines whether the HDD 100 is in the refreshing process mode (block 802). The determination in block 802 is made for the following reason. First, it takes a long time to refresh all of the segments in a track group. To prevent a decrease in the response to the command received from the host system 200 during the period of the refreshing process mode, it is desirable for the data refreshing process to be interrupted each time the data refreshing process is performed segment by segment. The determination in block 802 is related to this.

It is after the search of the write count table 400 (blocks 804 and 805) is completed that the HDD 100 is set in the refreshing process mode. The refreshing process mode is not cancelled until all the segments in the corresponding track group have been refreshed. Therefore, if the HDD 100 is in the refreshing process mode after the start of the data refreshing process (YES in block 802), a segment to be refreshed has always been specified. Therefore, if the result of the determination in block 802 is YES, the CPU 115 branches to block 806 and performs a refreshing operation.

On the other hand, if the HDD 100 is not in the refreshing process mode (NO in block 802), the CPU 115 refers to the write count table 400, thereby detecting the write count W(h, c) indicating the maximum number of writes (block 803). Then, the CPU 115 determines whether a track group specified by the head number h and cylinder group number c needs refreshing, depending on whether the number of writes represented by the detected write count W(h, c) has exceeded a threshold value (block 804). That is, the CPU 115 determines whether there is a track group which needs refreshing.

If there is a track group which needs refreshing (YES in block 804), the CPU 115 sets the HDD 100 in the refreshing process mode to perform data refreshing on the corresponding track group (block 805). In block 805, the CPU 115 sets a segment pointer for specifying a segment to be refreshed next in the track group so that the pointer may indicate the first segment "0" of the track group. Here, the segment pointer is set to "0" indicating the first segment "0." This segment pointer is stored in a predetermined area of the RAM 113. Next, the CPU 115 performs the processes in block 806 and forward.

In contrast, if there is no track group which needs refreshing (NO in block 804), the CPU 115 need not perform the data refreshing process and therefore branches to block 814 to terminate the data refreshing process and then proceeds from block 506 to block 507 as shown in the flowchart of FIG. 5.

As described above, in blocks 504 and 505, too, the CPU 115 determines whether to perform a data refreshing process. Blocks 504 and 505, however, differ from blocks 803 and 804 in that the determination is not made on the basis of the write count table 400, that is, it is not determined whether there is a track group which needs a data refreshing process.

Here, when blocks 504 and 505 are executed, if the write count table 400 needs referring to, determinations corresponding to blocks 803 and 804 may be made in blocks 504 and 505. For example, this corresponds to a case where whether the aforementioned data refreshing process should be avoided is determined on the basis of both of the level of the operating environment of the HDD 100 and the number of writes indicated by each write count in the write count table 400. For example, during the time when the number of times data is written into the track group (or the number of writes) is small even if the level of the operating environment is the same, the deterioration of the data in each segment of the track group is little. In such a state, the risk in passing up the data refreshing process is lower than the risk in performing the data refreshing process under bad conditions. In contrast, as the number of writes increases, the deterioration of the data in each segment in the track group gets worse. In such a state, the risk in performing the data refreshing process even under slightly bad conditions is lower than in passing up the data refreshing process. If such determinations are made in blocks 504 and 505, a track group whose number of writes is the largest is specified and the number of writes is obtained in blocks 504 and 505. In this case, such determinations are not necessarily made in blocks 803 and 804.

Then, in block 806, the CPU 115 determines (or detects) whether the last segment of the track group subjected to the data refreshing process has been refreshed. The determination is made on the basis of the aforementioned segment pointer. Specifically, the CPU 115 determines whether the last segment "N" has been refreshed, depending on whether the segment pointer has been set to "N+1." In the explanation below, suppose track group 301 is to be subjected to the data refreshing process.

If the last segment "N" has not been refreshed (NO in block 806), the CPU 115 branches to block 807. In block 807, the CPU 115 determines (or detects) whether a segment to be refreshed next is the first segment "0" in track group 301 or one of the other segments "1" to "N" (second track group).

First, if a segment to be refreshed next is the first segment "0" in track group 301 (YES in block 807), the CPU 115 branches to block 821. That is, if the first data refreshing operation 320 is carried out in the data refreshing process for track group 301, the CPU 115 branches to block 821.

As described above, the first segment "0" in track group 301 is used as an area (a temporary save area) into which the data in each of the second segment "1" to last segment "N" in track group 301 is saved. Then, in block 821, the CPU 115 reads the data in the first segment "0" into the buffer RAM 111 before the first segment "0" is used as a temporary save area. Then, the CPU 115 adds a header and a footer to the front and rear of the data in the read first segment "0" respectively and writes the header-and-footer-added data into the dedicated save area 303 (block 822). This causes the data in the first segment "0" to be saved into the dedicated save area 303. Blocks 821 and 822 correspond to the aforementioned save operation 321 (see FIG. 3).

In a state where block 822 has been executed, the data refreshing process 320 for the first segment "0" has not been completed. In the embodiment, however, the CPU 115 increments the segment pointer so that the segment pointer may point at segment "1" to be refreshed next to perform data refreshing operation $322_{-1}$ on the next segment "1" (block 812).

On the other hand, if a segment to be refreshed next is one of the second segment "1" to last segment "N" in track group 301 (hereinafter, referred to as segment "i") (NO in block 807), the CPU 115 branches to block 808. In block 808, the CPU 115 reads the data in segment "i" (i=1, 2, N) into the buffer RAM 111.

Next, the CPU 115 adds a header and a footer to the front and rear of the data in the read segment "i" respectively and writes the header-and-footer-added data into the first segment "0" of track group 301 (block 809). That is, the CPU 115 uses segment "0" as a temporary save area for the data in segment "1" and saves the data read from segment "i" and added with the header and footer into the segment "0."

Next, the CPU 115 writes (or rewrites) the data read from segment "i" into the buffer RAM 111 into the segment "1," thereby refreshing the segment "i" (block 810). Next, the CPU 115 clears (or invalidates) the header added to the data saved in the first segment "0" (block 811). This completes the data refreshing operation $320_{-i}$ for refreshing segment "i." Then, the CPU 115 increments the segment pointer from "i" to "I+1" (block 812) to cause the segment pointer to point at segment "i+1" to be refreshed next.

If the last segment "N" has been refreshed (YES in block 806), the CPU 115 branches to block 831. In a state where the last segment "N" has been refreshed, the data in the first segment "0" has been saved into the dedicated save area 303 in blocks 821 and 822 (in the save operation 322 in the data refreshing operation 320). Here, the data refreshing operation 320 has not been completed and the first segment "0" has not been refreshed.

Accordingly, in block 831, the CPU 115 reads the data in the first segment "0" saved in the dedicated save area 303 into the buffer RAM 111 in order to refresh the first segment "0" (block 831). Next, the CPU 115 writes (or rewrites) the data read from the dedicated save area 303 into the buffer RAM 111 into the first segment "0," thereby refreshing the first segment "0" (block 832). Next, the CPU 115 clears (or invalidates) the header added to the data saved in the dedicated save area 303 (block 833).

This completes the data refreshing operation 320 for refreshing the first segment "0." That is, all of segments "0" to "N" in track group 301 have been refreshed. To indicate that there is no track group being subjected to a refreshing process, the CPU 115 cancels the refreshing process mode (block 834). Block 834 is needed to make a correct determination in blocks 702 and 802.

Next, the CPU 115 clears the write count corresponding to track group 301 in the write count table 400 (i.e., the track group subjected to the refreshing process) (block 835). As a result, the value of the write count corresponding to track group 301 is 0. The meaning of block 835 will be explained below.

Each write count in the write count table 400 indicates the number of times data was written into the corresponding track group (or the number of writes) as described above. The number of writes correlates with the degree of deterioration of the data in the corresponding track group. Accordingly, the number of writes is treated as the degree of deterioration of data for the purpose of convenience. Immediately after the refreshing process for a track group, there is no deterioration of data in the track group. To reflect this on the corresponding write count in the write count table 400, block 835 is executed.

The CPU 115 then executes block 812 and branches to block 813. When having executed block 835, the CPU 115 also branches to block 813. That is, when having refreshed any one segment in the track group subjected to the refreshing process, the CPU 115 branches to block 813.

In block 813, the CPU 115 determines whether there is a request for the interruption of the refreshing process. The reception of a command from the host system 200 is one of the conditions for making a request for the interruption of the refreshing process. If the host module 123 of the HDC 110 receives a command from the host system 200, the HDD 100 immediately goes into a busy state and, at the same time, sets a busy flag indicating the busy state. The CPU 115 then monitors the state of the flag. The busy flag is set, regardless of whether the data refreshing process is being performed. Accordingly, the response time of the command recognized by the host system 200 is the sum of the time required to complete the data refreshing process now being performed and the original command execution time. When the command from the host system 200 is received, if the execution of the command is made to wait until the data refreshing process has been completed, the responsiveness to the command will be degraded. To avoid this, block 813 is executed.

If there is a request for interruption of the refreshing process (YES in block 813), the CPU 115 branches to block 814 to immediately interrupt the data refreshing process and proceeds from block 506 to block 507 as shown in the flowchart of FIG. 5. In this case, the CPU 115 executes the same process in block 507 as in block 813 in order to immediately branch to block 503 and start a process (or command execution process) for the received command.

In contrast, if there is no request for interruption of the refreshing process (NO in block 813), the CPU 115 branches again to block 802 to determine whether the HDD 100 is in the refreshing process mode. Here, in a state where all of the segments in the track group have been refreshed, the refreshing process mode has been cancelled in block 834. That is, the HDD 100 is not in the refreshing process mode (NO in block 802). In this case, as described above, the CPU 115 searches for a track group which needs refreshing on the basis of the write count table 400 (blocks 803 and 804). If there is no track group which needs refreshing (NO in block 804), the CPU 115 branches to block 814 to terminate the data refreshing process. As described above, if there is no request for the interruption of the refreshing process (NO in block 813), it is only when no track group needing the refreshing process left is present that the data refreshing process is terminated (NO in block 804).

On the other hand, in a state where one of the segments excluding the first segment "0" (i.e., one of segments "1" to "N") in the track group has been refreshed, the refreshing process mode has not been cancelled. That is, the HDD 100 is in the refreshing process mode (YES in block 802). In this case, the CPU 115 branches to block 806.

The various modules of the magnetic disk drive described herein can be implemented as software applications, hardware and/or software modules. While the various modules are illustrated separately, they may share some or all of the same underlying logical or code.

While certain embodiments of the inventions have been described, these embodiments have been presented by way of example only, and are not intended to limit the scope of the inventions. Indeed, the novel apparatuses and methods described herein may be embodied in a variety of other forms; furthermore, various omissions, substitutions and changes in the form of the apparatuses and methods described herein may be made without departing from spirit of the inventions. The accompanying claims and their equivalents are intended to cover such forms or modifications as would fall within the scope and spirit of the inventions.

What is claimed is:

1. A method of refreshing data on a disk in a magnetic disk drive, the disk comprising a plurality of track groups, each of the plurality of track groups comprising one or more data tracks, the one or more data tracks comprising a first segment and a second segment, the method comprising:
    saving first data in the first segment into a predetermined area on the disk before refreshing the first segment and the second segment in one of the plurality of track groups;
    saving second data in the second segment into the first segment after saving the first data;
    rewriting the second data into the second segment in order to refresh the second data in the second segment after saving the second data; and
    rewriting the first data in the predetermined area into the first segment after refreshing the second segment.

2. The method of claim 1, wherein the predetermined area is outside of the first segment and the second segment.

3. The method of claim 2, wherein:
    the saving second data comprises:
        reading the second data from the second segment; and
        adding a header and a footer indicating validity of the read second data to the head and tail end of the read second data, respectively; and
    the size of the first segment is larger than the second segment by a size corresponding to the header and footer.

4. The method of claim 3, wherein:
    the read second data is rewritten into the second segment after the header-and-footer-added second data is saved into the first segment; and
    the method further comprises invalidating the header added to the second data in the first segment after rewriting the read second data into the second segment.

5. The method of claim 4, wherein:
    the saving first data comprises:
        reading the first data from the first segment; and
        adding a header and a footer indicating validity of the read first data to the head and tail end of the read first data, respectively; and
    the size of the predetermined area is larger than the first segment by a size corresponding to the header and footer.

6. The method of claim 5, further comprising invalidating the header added to the first data in the predetermined area after rewriting the first data in the predetermined area into the first segment.

7. The method of claim 6, further comprising detecting whether the power supply of the magnetic disk drive is shut down during refreshing, on the basis of the header and footer added to the first data in the predetermined area and the header and footer added to the second data in the first segment.

8. The method of claim 7, further comprising:
    rewriting the second data in the first segment into the second segment when a valid header and footer are added to both of the first data in the predetermined area and the second data in the first segment; and
    invalidating the header added to the second data in the first segment after rewriting the second data in the first segment into the second segment.

9. The method of claim 8, wherein:
    the valid header and footer added to the second data in the first segment comprise a character string indicating that the header and footer are valid and attribute information addressing the second segment storing the second data; and
    the second segment is identified based on the attribute information in the valid header and footer added to the second data saved in the first segment.

10. The method of claim 9, further comprising:
    rewriting the first data in the predetermined area into the first segment when at least a valid header and footer are added to the first data in the predetermined area; and
    invalidating the header added to the first data in the predetermined area after rewriting the first data in the predetermined area into the first segment.

11. A magnetic disk drive comprising:
    a disk comprising a plurality of track groups, each of the plurality of track groups comprising one or more data tracks, and the one or more data tracks comprising a first segment and a second segment; and
    a controller configured to control refreshing data on the disk, wherein the controller is configured to save first data in the first segment into a predetermined area on the disk before refreshing the first segment and the second segment in one of the plurality of track groups, to save second data in the second segment into the first segment after saving the first data, to rewrite the second data into the second segment in order to refresh the second data in the second segment after saving the second data, and to rewrite the first data in the predetermined area into the first segment after refreshing the second segment.

12. The magnetic disk drive of claim 11, wherein the predetermined area is outside of the first segment and the second segment.

13. An electronic apparatus comprising:
    the magnetic disk drive of claim 11; and
    a host configured to use the magnetic disk drive as a storage module.

* * * * *